US008636867B2

United States Patent
Sutter

(10) Patent No.: US 8,636,867 B2
(45) Date of Patent: Jan. 28, 2014

(54) METHOD FOR PRODUCING AN ESCAPE ROUTE MARKING AND AN ESCAPE ROUTE MARKING

(75) Inventor: Wolfgang Sutter, Halstenbek (DE)

(73) Assignee: Lufthansa Technik AG, Hamburg (DE)

( * ) Notice: Subject to any disclaimer, the term of this patent is extended or adjusted under 35 U.S.C. 154(b) by 0 days.

(21) Appl. No.: 13/393,581

(22) PCT Filed: Aug. 31, 2010

(86) PCT No.: PCT/EP2010/005327
§ 371 (c)(1),
(2), (4) Date: Mar. 15, 2012

(87) PCT Pub. No.: WO2011/026598
PCT Pub. Date: Mar. 10, 2011

(65) Prior Publication Data
US 2012/0282428 A1 Nov. 8, 2012

(30) Foreign Application Priority Data
Sep. 1, 2009 (DE) .......................... 10 2009 040 042

(51) Int. Cl.
*B32B 3/02* (2006.01)
(52) U.S. Cl.
USPC ....................................... 156/272.8
(58) Field of Classification Search
USPC .................. 156/67, 272.8, 272.2; 264/21
See application file for complete search history.

(56) References Cited

U.S. PATENT DOCUMENTS

| 7,074,345 B2 | 7/2006 | Saito et al. |
| 2002/0015309 A1 | 2/2002 | Stokes et al. |
| 2004/0137266 A1* | 7/2004 | Saito et al. ..................... 428/690 |

FOREIGN PATENT DOCUMENTS

| DE | 197 00 310 A1 | 7/1998 |
| DE | 696 03 186 T2 | 2/2000 |
| DE | 697 07 508 T2 | 5/2002 |
| DE | 296 24 636 U1 | 12/2006 |
| DE | 20 2007 010 221 U1 | 12/2008 |
| DE | 10 2008 011 405 A1 | 9/2009 |
| EP | 0 489 561 A1 | 6/1992 |
| EP | 0 828 657 B1 | 3/1998 |
| EP | 1 783 000 A1 | 5/2007 |
| EP | 1970100 A1 * | 9/2008 |
| EP | 1987861 A1 * | 11/2008 |
| WO | 96/33093 A1 | 10/1996 |
| WO | 98/04645 A1 | 2/1998 |

(Continued)

OTHER PUBLICATIONS

PCT Written Opinion of the ISA (German Language) with Statement of Relevancy.

*Primary Examiner* — Daniel McNally
(74) *Attorney, Agent, or Firm* — Vidas, Arrett & Steinkraus, P.A.

(57) ABSTRACT

A method for producing an escape route marking and the apparatus for an airplane comprising a luminous layer that luminesces in the dark, and a profile having two profile elements that can be connected to each other, wherein in a first of the profile elements, the luminous layer is arranged in a recess extending in the longitudinal direction, and the second profile element is provided to be connected with a base, wherein the procedure comprises the following steps:
production of the luminous layer from a mixture of a silicone material and from photoluminescent pigments, and introduction of the mixture in a liquid state into the recess of the first profile element, wherein the mixture cures in the seat by crosslinking with the walls in the profile.

8 Claims, 3 Drawing Sheets

(56) References Cited

FOREIGN PATENT DOCUMENTS

| WO | 01/52224 A1 | 7/2001 |
| WO | 2008/110344 A1 | 9/2008 |
| WO | WO 2008110344 A1 * | 9/2008 |

* cited by examiner

METHOD FOR PRODUCING AN ESCAPE ROUTE MARKING AND AN ESCAPE ROUTE MARKING

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to a method for producing an escape route marking, and an escape route marking.

It is known to arrange photoluminescent strips on the floor of the interior of an airplane to mark the escape routes. Photoluminescence is occasionally termed afterglow and/or phosphorescence. The technical safety requirements for marking escape routes are for example specified in German industrial standard DIN 67510. The strips are placed on the floor of the airplane cabin and, in an emergency, indicate to passengers and the flight crew the path to ways out and emergency exits. In the past when equipping airplanes and airplane cabins, photoluminescent strips became increasingly accepted as escape route markings since these are failsafe and can work without a power supply.

A continuous fluorescent layer is known from EP 0 489 561 A1 in which color pigments are incorporated in a polymer matrix. The fluorescent material can be incorporated in a carrier medium that lends the fluorescent light various optical properties by means of additional filters.

An emergency lighting system for an airplane is known from US 2002/0015309 A1 in which photoluminescent material is arranged in a sealed sheath. The sheath is held to the floor of the airplane in a press fit between two parallel rails. The photoluminescent material is inserted in the sheath, the ends of which are closed by a cover.

Emergency lighting for an airplane is known from WO 01/52224 A1 in which escape route markings are used in the form of inserts, self adhesive strips and paint in the airplane interior.

An emergency lighting unit for the interior of an airplane is known from EP 0 828 657 B1 that is held in position by means of a cover element directly connected to the floor of the airplane.

A photoluminescent material is known from U.S. Pat. No. 7,074,345 B2 that is made from a mixture of a transparent base material and photoluminescent pigments, wherein the viscosity of the transparent base material is 1 Pa·s or more than 20° C., and photoluminescent pigments are added at an amount of 7 to 95% by weight. For the use of a silicone material as the transparent base material, a viscosity of 70 Pa·s and average particle size of 150 μm is suggested for the photoluminescent pigments.

In addition to sufficient luminosity, in order for an escape route marking to be used in the airplane cabin, it is essential for it to withstand the loads in the interior of the airplane arising both from the passengers as well as from stress introduced into the escape route marking by the airplane floor.

BRIEF SUMMARY OF THE INVENTION

The object of the invention is to provide an escape route marking with superior luminance which is robustly designed to be used in the interior of an airplane.

The method according to the invention is for producing an escape route marking for an airplane comprising a luminous layer that luminesces in the dark, and a profile having two profile elements that can be connected to each other, wherein in a first of the profile elements, the luminous layer is arranged in a recess extending in the longitudinal direction, characterized by The production of the luminous layer from a mixture of a silicone material and from photoluminescent pigments, The introduction of the mixture in a liquid state into the recess of the first profile element, wherein the mixture cures in the recess by crosslinking with the walls in the profile element.

The method according to the invention creates a frictional connection, preferably an integral connection, between the profile element that accommodates the luminous layer and the luminous layer itself. This ensures that the profile element possesses sufficient stability, and cracks in the profile can be avoided. On the other hand, introducing the mixture in a liquid state into the recess and curing the mixture with the photoluminescent pigments in the recess, allows silicone materials to be used that have a low viscosity and are unsuitable to be inserted in a hollow profile due to their rigidity. According to the invention, the second profile element is provided to be connected with the base. This means that the profile element in which the luminescent layer has been introduced is the profile element through which the luminescent layer is visible in the installed position. Of course, the first profile element is designed partially transparent so that the light of the luminous layer can be perceived. According to the invention, the escape route marketing is produced "upside down" by introducing the mixture into the first profile element that, in the installed state, forms the radiant top side of the escape route marking.

In a preferred embodiment of the invention, the silicone material, at a temperature of 20° C., has a viscosity of less than 9.5 Pa·s, and the average particle size of the pigments is less than 150 μm, wherein the percentage of the pigments in the mixture is 50 to 90% by weight. Using a thin silicone material makes it possible to use pigments with a small average particle size and thereby achieve sufficient luminosity. In particular, since the luminous layer is introduced in liquid form into the first profile element in the method according to the invention, it is possible to work with thin, low viscosity silicone materials and add pigments to them that have a very low average particle size.

In one embodiment of the method, the mixture is introduced into the recess by being poured. The pouring can be directly into the designed profile element, wherein the introduced mixture can evenly fill the recess in the profile element by itself or distributed with a spreader. The advantage of pouring the mixture into the recess is that an even thickness of the luminous layer can be achieved. This also ensures that a continuous luminous layer forms, and the luminous layer contacts the profile element without bubbles or cavities. It is alternately possible to continuously inject the mixture into the designed profile element for example by a nozzle or a screw, or to extract the mixture therein.

In a preferred embodiment of the method according to the invention, the luminous layer is covered with the second profile element by connecting the first profile element after the mixture hardens. The cover of the first profile element protects the luminous layer from moisture and mechanical stress.

In a preferred development, the connection between the first and second profile elements is made by adhering and/or welding the profile elements. Alternately or in addition, it is also possible to connect to the first and second profile elements to each other in a frictional connection, preferably in a keyed connection. This can be accomplished by projections or latching elements in the profile elements.

In a preferred embodiment, at least the inner walls in the first profile element are subject to a surface treatment before the mixture is introduced into the recess. The surface treatment is to promote the cross-linkage of the silicone material with the wall material of the first profile element. Infrared irradiation is preferably used for the surface treatment that is directed toward the first profile element and the silicone material after the silicone material has been introduced.

A flame treatment of the first profile element has also proven to be useful for the surface treatment. This can be done in addition or alternatively to infrared treatment irradiation. Likewise, primer and/or plasma irradiation can be used for the first profile element to prepare the surface for improved cross-linkage with the liquid or hardening mixture.

The escape route marking for an airplane has a luminous layer that luminesces in the dark and a profile that has two profile elements which can be connected to each other, wherein the luminous layer is arranged in a recess of the first profile element. The luminous layer consists of a silicone material having photoluminescent pigments, and is friction connected, preferably integrally bonded, to the first profile element. The friction locked and especially integral connection between the luminous layer and profile element helps stabilize the profile. In addition, the surface of the first profile element can be designed slightly convex so that liquid flows off it. This makes it possible for example to avoid stress cracks in the first profile element that arise from cleaning fluid.

The first profile element preferably consists of a transparent plastic material, wherein the transparent plastic material can also be colored to achieve a color that is different from the luminescing color of the luminous layer.

In a preferred embodiment, the first profile element possesses a recess extending in the longitudinal direction which is delimited by two parallel sidebars. The side bars on one hand neighbor the side recess so that the mixture can be added in a liquid state, and on the other hand, they can support a connection between the first and second profile elements.

The second profile element preferably possesses a recess extending in a longitudinal correction in which the luminous layer connected to the first profile element is inserted when the first and second profile elements are connected with each other. The recess of the second profile element serves as a seat for the luminous layer that is fastened in a recess in the first profile.

BRIEF DESCRIPTION OF THE SEVERAL VIEWS OF THE DRAWINGS

Preferred embodiments of the invention will be further explained below with reference to the figures. In the figures.

DETAILED DESCRIPTION OF THE INVENTION

Figure 1:
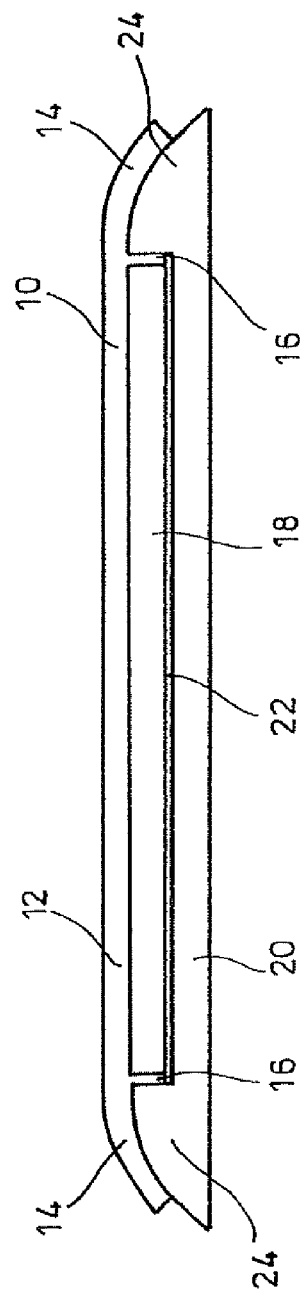
FIG. 1 shows a cross-section of an escape route marking according to the invention in which the recess is delimited by side bars.

While this invention may be embodied in many different forms, there are described in detail herein a specific preferred embodiment of the invention. This description is an exemplification of the principles of the invention and is not intended to limit the invention to the particular embodiment illustrated FIG. 1 shows a first profile element 10 that possesses a flat basic section 12 as well as two laterally angled side sections 14. At the transition between the basic section 12 and side section 14, there are provided two bars 16 which extend continuously in the longitudinal direction of the profile element. The free end of the side area 14 is approximately at the height of the free end of the bar 16 so that the outer edge of the side area and free end of the bars lie in a plane.

The luminous layer 18 is poured into the seat of the first profile element 10 formed by the basic section 12 and bars 16. The luminous layer 18 is continuously poured into the profile element in a liquid state and cures therein. With the curing of the luminous layer in the profile element, the materials form a connection that holds the luminous layer in the profile element with a connecting force. This connecting force is derived from an integral bond. By surface treating the recess, the silicone material cross-links with the material of the profiled strip when it cures. Preferably, only one layer of the silicone material is introduced into the profiled strip. It is not necessary to use several layers of silicone material since the pigments can be prevented from disadvantageously settling on the bottom of the luminous layer by adjusting, according to the invention, the viscosity and particle size of pigments; instead, they are distributed substantially evenly in the silicone in advantageous manner. The profiled strip is preferably made of a polycarbonate (PC) material. The first profile element 10 with the cured luminous layer 18 is connected to the second profile element 20. The second profile element 20 has a recess 22 that is delimited by side sections 24. The line of the contour of the side sections 24 corresponds in its shape to the curved side sections 14 so that the surface of the first profile element 10 lies against the second profile elements 20. The second profile element 20 has a smooth bottom side and can be additionally equipped with means for connecting to the base. A PC plastic can also be provided as the material for the second profile element 20. In contrast to the first profile element 10, it is unnecessary for the second profile element 20 to be designed transparent or translucent.

The recess 22 in the second profile element 20 is dimensioned such that a frictional connection arises between the bars 16 and the insides of the side sections 24.

In addition to the frictional connection, the side sections 16 can be integrally connected, i.e., adhered or welded, to the side sections 24 of the other profile element.

Figure 2:
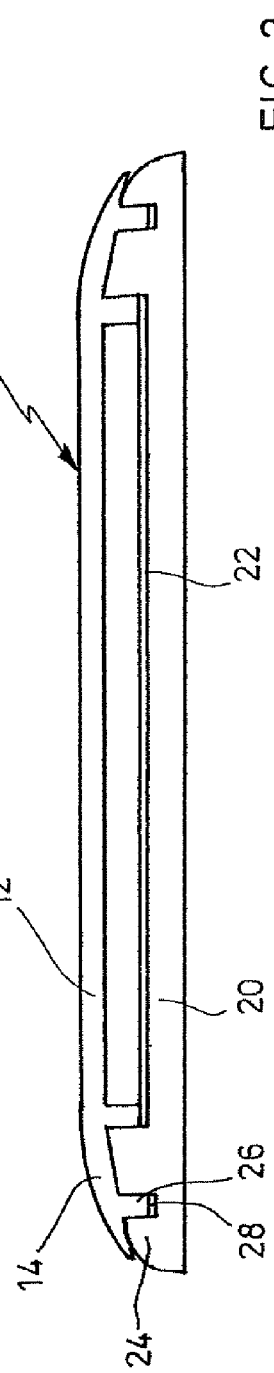
FIG. 2 shows a second embodiment of the escape route marking according to the invention in which a keyed connection is created between the profile elements by bars.

In FIG. 2, the side section 14 is additionally provided with a bar 26. The side section 24 of the second profile element 20 also has a recess 28 in which the bar 26 is arranged. As is the case with the connection described with reference to FIG. 1, additional bars and 16 can be seated clamped in the recess 28. These can also be adhered.

Figure 3:
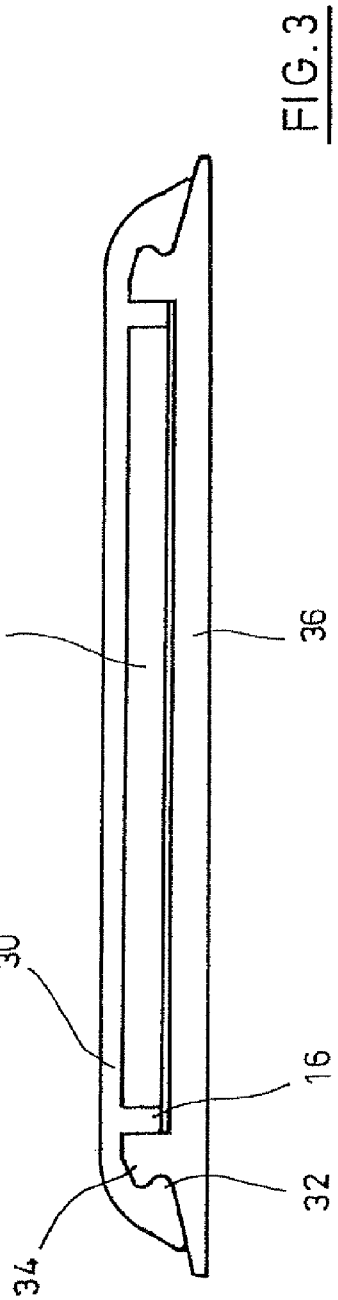
FIG. 3 shows a third embodiment in which the profile elements are connected to each other by means of a keyed connection.

FIG. 3 shows an embodiment in which a first profile element 30 is fastened to the second profile element 36 by means of a snap connection. As is the case with the versions shown in FIG. 1 and FIG. 2, the first profile element 30 is equipped with a recess delimited by bars 16 that is filled with a luminous layer 18. The side area of the first profile element 30 has a projection 32 that grips behind a catch 34 of the second profile element 36.

Figure 4:
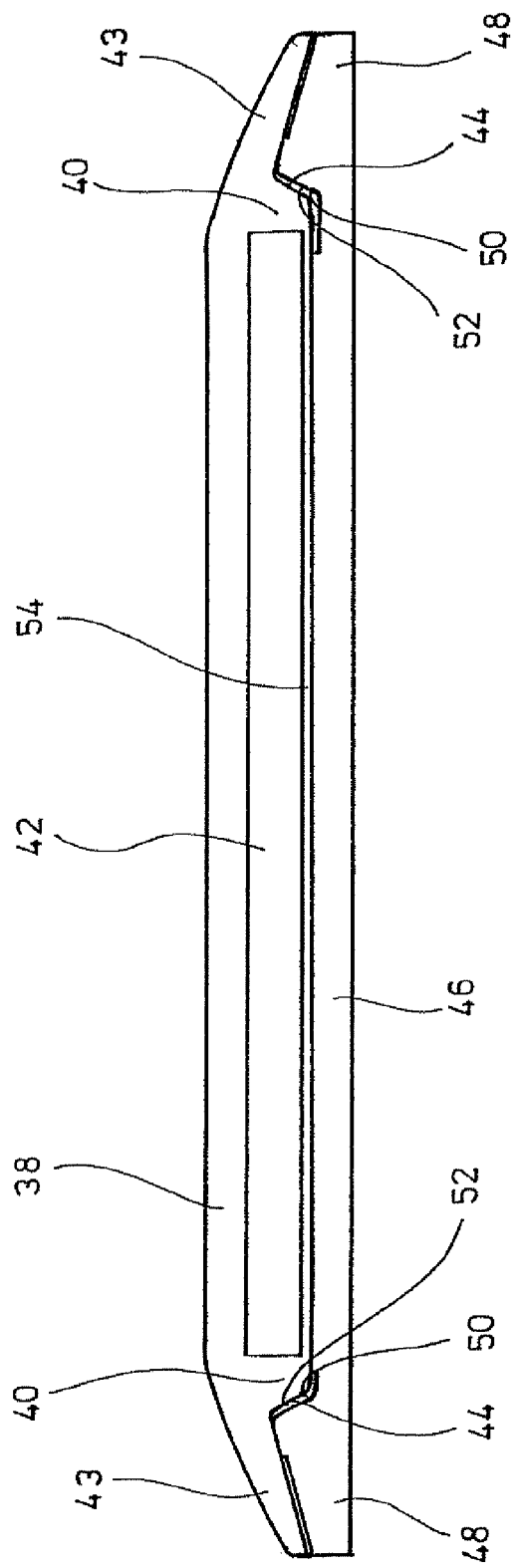
FIG. 4 shows a fourth embodiment in which the side sections of the profile elements are connected to each other.

FIG. 4 shows another embodiment in which a first profile element 38 has bars 40 that delimit the side of the recess for accommodating the luminous layer 42. On their side facing the side sections 43, the bars 40 possess a beveled sidewall 44. The second profile element 46 possesses a second recess in which the bars 40 with the luminous layer 42 are inserted. The second recess is delimited on the side by a side section 48 that has a beveled sidewall 50. Between the sidewalls 44 and 50 there is an air gap 52 that also extends below the free end of the bar 40. The air gap allows the bar elements 38 and 46 to be connected with a sufficient production tolerance. In addition, the air gap 52 gives the bar element 38 sufficient play when it is loaded from above.

Between the luminous layer 42 and the second profile element 46 is a reflective layer 54 that for example is designed with a white color, and reflects the light from the luminous layer back into it. Such a reflective layer can also be seen in the embodiments in FIGS. 1 to 3.

The side sections 48 and 43 are integrally connected by adhesion and/or welding to each other. A double-sided adhesive tape, for example, can also be provided for adhesion.

The production procedure in FIG. 5 will be further explained below.

Figure 5:
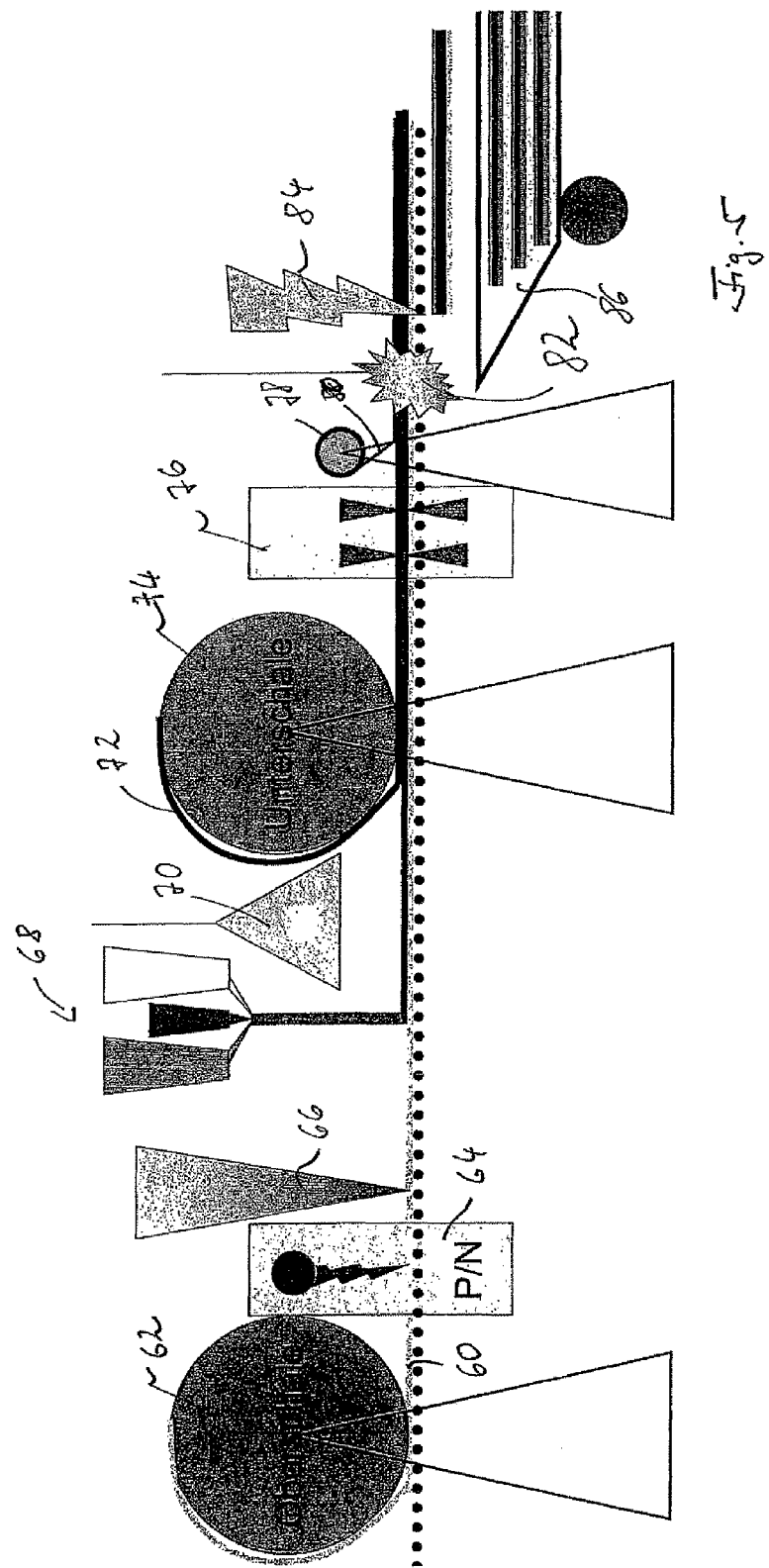
FIG. 5 shows a schematic view of the production of the escape route marking.

The first profile element 60 is shown on the left side in FIG. 5, and it is continuously unwound off a drum 62. The first profile element 60 that is designed as an upper shell can be processed as a continuous profile element in the production procedure shown in FIG. 5. In a following step 64, the profile element 60 is irradiated with laser light. A labeling laser with a relatively low output can be used to do this which serves to apply a part number or another identification. In a following step 66, the seat for the silicone material provided for the first profile element is exposed to flame. The flame prepares the first profile element for subsequently accommodating the silicone mixture. In a procedural steps 68, the silicone mixture is introduced into the first profile element 60. The silicone mixture is introduced in a substantially liquid form, and the pigments are kept from falling or settling too much by adjusting the viscosity of the silicone mixture. In a subsequent step 70, the silicone mixture introduced into the first profile element undergoes infrared irradiation. This achieves a good preliminary cross-linking of the silicone material in the first profile element 60, whereby the dimensional stability of the luminous layer increases. As in FIG. 5, the silicone mixture can be subjected directly to infrared radiation. Alternately or in addition, it is also possible to expose the silicone mixture introduced in step 68 to infrared radiation through the transparent first profile element. In a following procedural step, the second profile element 72 is wound off of a drum 74. The second profile element 72 is applied on the first profile element 60 and seals it. If an additional reflector layer is to be introduced between the luminous strip and seconds profile element, this additional reflector layer can be introduced between steps 70 and 72.

In a subsequent step 76, the two profile elements 60 and 72 are welded. A stationary laser can be used for the welding 76 of the profile elements that continuously welds the profile elements to each other along their edge.

In a subsequent procedural step 78, a continuous adhesive strip 80 is applied to the top side of the second profile element 72. The adhesive strip 80 can for example be designed in the form of a double-sided adhesive strip by means of which, after a protective film is removed from the adhesive surface, the finished escape route marking can be adhered to the base.

An automatic quality check occurs in a subsequent step 82. The automatic quality check 82 is continuous and ongoing during production. The quality check 82 can for example optically inspect the weld seams between the first and second profile element, the thickness of the introduced silicone material, or the arrangement of the adhesive strip 80.

In a following procedural step 84, the continuously produced escape path markings can be cut into a predetermined length so that they can then be transported by a cart 86.

The above-described procedure in which the profile elements are joined by a static laser past which the workpiece continuously moves allows continuous, endless production of an escape route marking. The resulting advantage is that the escape route markings can be created in different lengths during production to thereby provide the desired length of escape route marking for later installation.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method for producing an escape route marking for an airplane comprising a luminous layer that luminesces in the dark, and a profile having two profile elements that can be connected to each other, wherein in a first of the profile elements, the luminous layer is arranged in a recess extending in the longitudinal direction, said recess being formed by walls in the profile element, and the second profile element is provided to be connected with a base, wherein the procedure comprises the following steps:
   production of the luminous layer from a mixture of a silicone material and from photoluminescent pigments, and
   introduction of the mixture in a liquid state into the recess of the first profile element, wherein the mixture cures in the recess by crosslinking with the walls in the profile.

2. The method according to claim 1, wherein the walls in the first profile element forming the recess are subject to a surface treatment before the mixture is introduced into the recess.

3. The method according to claim 2, wherein a flame treatment is performed as the surface treatment.

4. The method according to claim 1, wherein the viscosity of the silicone material is less than 9.5 Pa·s [20'C], and the average particle size of the pigments is less than 150 μm, and the percentage of the pigments in the mixture is 50-90% by weight.

5. The method according to claim 1, wherein the mixture to be introduced into the recess is poured.

6. The method according to claim 1, wherein after the mixture is cured, the luminous layer is covered by connecting the first and second profile elements.

7. The method according to claim 1, wherein the first and second profile element are integrally connected and/or keyed to each other.

8. The method according to claim 1, wherein the first and second profile elements are welded by a stationary laser.

* * * * *

UNITED STATES PATENT AND TRADEMARK OFFICE
CERTIFICATE OF CORRECTION

PATENT NO. : 8,636,867 B2  Page 1 of 1
APPLICATION NO. : 13/393581
DATED : January 28, 2014
INVENTOR(S) : Wolfgang Sutter It is certified that error appears in the above-identified patent and that said Letters Patent is hereby corrected as shown below:

In the claims

Column 6, Line 49, delete "[20'C]" and insert --[20°C]--

Signed and Sealed this
Fifteenth Day of July, 2014

Michelle K. Lee
*Deputy Director of the United States Patent and Trademark Office*